United States Patent
Mitsui et al.

(10) Patent No.: US 7,380,830 B2
(45) Date of Patent: Jun. 3, 2008

(54) VEHICLE FRONT BODY STRUCTURE

(75) Inventors: Jun Mitsui, Wako (JP); Shigeto Yasuhara, Wako (JP); Ken Yasui, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 142 days.

(21) Appl. No.: 11/345,788

(22) Filed: Feb. 2, 2006

(65) Prior Publication Data

US 2006/0170206 A1    Aug. 3, 2006

(30) Foreign Application Priority Data

Feb. 3, 2005    (JP)    ............... 2005-028120
Feb. 4, 2005    (JP)    ............... 2005-028638

(51) Int. Cl.
*B62D 21/00*    (2006.01)

(52) U.S. Cl. .................. 280/784; 280/785; 180/274; 180/311; 296/187.03; 296/187.08

(58) Field of Classification Search ............... 280/781, 280/784, 785, 800; 180/311, 312, 298, 299, 180/274; 296/187.03, 187.08, 187.09
See application file for complete search history.

(56) References Cited

U.S. PATENT DOCUMENTS

| | | | | | |
|---|---|---|---|---|---|
| 3,827,712 | A | * | 8/1974 | Suzuki et al. ............... | 280/784 |
| 4,684,151 | A | * | 8/1987 | Drewek ...................... | 280/784 |
| 5,037,142 | A | * | 8/1991 | Helping ...................... | 285/256 |
| 5,118,160 | A | * | 6/1992 | Kitagawa et al. ...... | 296/187.03 |
| 5,125,715 | A | * | 6/1992 | Kijima ................... | 296/187.09 |
| 5,466,033 | A | * | 11/1995 | Murakami et al. ..... | 296/203.02 |
| 5,472,063 | A | * | 12/1995 | Watanabe et al. ........... | 180/274 |
| 5,562,329 | A | * | 10/1996 | Srock et al. ........... | 296/203.01 |
| 5,806,918 | A | * | 9/1998 | Kanazawa .................. | 296/204 |
| 5,868,457 | A | * | 2/1999 | Kitagawa ............... | 296/187.09 |
| 5,884,963 | A | * | 3/1999 | Esposito et al. ....... | 296/187.09 |
| 5,913,565 | A | * | 6/1999 | Watanabe .............. | 296/187.03 |
| 5,984,403 | A | * | 11/1999 | Kuroda ................... | 296/187.03 |
| 6,056,337 | A | * | 5/2000 | Oguri et al. ................ | 293/142 |
| 6,099,071 | A | * | 8/2000 | Kasuga et al. .............. | 296/205 |
| 6,152,521 | A | * | 11/2000 | Hayashi et al. ........ | 296/187.09 |
| 6,250,710 | B1 | * | 6/2001 | Matsuzaki ............. | 296/203.02 |
| 6,312,028 | B1 | * | 11/2001 | Wilkosz ..................... | 293/133 |
| 6,312,038 | B1 | * | 11/2001 | Kawamura et al. ........ | 296/68.1 |
| 6,460,889 | B2 | * | 10/2002 | Iyanagi et al. .............. | 280/784 |
| 6,676,160 | B2 | * | 1/2004 | Stanley ....................... | 280/797 |
| 6,695,392 | B2 | * | 2/2004 | Stoffels et al. ......... | 296/187.09 |

(Continued)

FOREIGN PATENT DOCUMENTS

JP    8-108863    4/1996

*Primary Examiner*—Christopher Bottorff
*Assistant Examiner*—Timothy Wilhelm
(74) *Attorney, Agent, or Firm*—Rankin, Hill & Clark LLP

(57) ABSTRACT

A vehicle front body structure includes a hollow front side frame of closed cross-sectional structure having a wheel relief portion having a horizontal width reducing to allow swivel movement of a front wheel of the vehicle. The wheel relief portion has a pair of reinforcement beads extending in a longitudinal direction of the vehicle and projecting from an outer sidewall and an inner sidewall, respectively, of the front side frame into an internal space of the hollow front side frame. The reinforcement beads have top surfaces being in abutment with each other and firmly fixed together.

9 Claims, 9 Drawing Sheets

U.S. PATENT DOCUMENTS

| | | |
|---|---|---|
| 6,705,668 B1 * | 3/2004 | Makita et al. .......... 296/187.03 |
| 6,830,075 B1 * | 12/2004 | McKinney et al. .......... 138/106 |
| 6,893,078 B2 * | 5/2005 | Saeki .................... 296/187.09 |
| 6,915,870 B2 * | 7/2005 | Sugiyama et al. ......... 180/69.4 |
| 6,926,352 B2 * | 8/2005 | Gotou et al. ................ 296/204 |
| 6,938,948 B1 * | 9/2005 | Cornell et al. ......... 296/187.09 |
| 7,097,235 B2 * | 8/2006 | Yasukouchi et al. ... 296/187.03 |
| 7,144,039 B2 * | 12/2006 | Kawasaki et al. .......... 280/784 |
| 7,185,945 B2 * | 3/2007 | Dandekar et al. ...... 296/187.09 |
| 7,222,912 B2 * | 5/2007 | Deme et al. ........... 296/203.02 |
| 7,229,098 B2 * | 6/2007 | Mangalaramanan et al. .......................... 280/781 |
| 7,252,314 B2 * | 8/2007 | Tamura et al. ............... 293/133 |
| 2001/0033094 A1 * | 10/2001 | Sano et al. .................. 296/194 |
| 2003/0102696 A1 * | 6/2003 | Matsuoka .............. 296/203.04 |
| 2004/0135384 A1 * | 7/2004 | Pritchard et al. ........... 293/120 |
| 2005/0057053 A1 * | 3/2005 | Evans et al. ................ 293/133 |
| 2005/0151392 A1 * | 7/2005 | Yasukouchi et al. ... 296/187.03 |
| 2006/0001228 A1 * | 1/2006 | Yoshimura ........... 280/124.109 |
| 2006/0125226 A1 * | 6/2006 | Barbat et al. ............... 280/784 |

* cited by examiner

VEHICLE FRONT BODY STRUCTURE

FIELD OF THE INVENTION

The present invention relates to a vehicle front body structure including a front side frame having a wheel relief portion for allowing swivel movement of a front wheel of the vehicle.

BACKGROUND OF THE INVENTION

Vehicle front body structures generally include a pair of laterally spaced front side frames extending in a longitudinal direction of the vehicle, and right and left front wheels disposed on lateral outer sides of the respective front side frames. A particular example of such vehicle front body structures is disclosed in Japanese Patent Laid-Open Publication (JP-A) No. 8-108865.

The disclosed vehicle front body structure, as shown in FIG. 9A hereof, includes left and right front side frames 201 (only left one being shown) extending in a longitudinal direction of the vehicle with a combined engine-and-transmission unit 205 disposed between the left and right front side frames 201. Left and right front wheels 206 (only left one being shown) are disposed on lateral outer sides of the respective front side frames 201. Each of the front side frames 201 has a pair of vertically spaced ribs or beads 202 and 203 extending in a longitudinal direction of the front side frame 201 to reinforce a part of the front side frame 201 to thereby control a buckling strength of the front side frames 201.

As shown in FIG. 9B, the beads 202, 203 are formed on each of an outer sidewall 207 and an inner sidewall 208 of the respective front side frames 201. The beads 202, 203 projects into an internal space of each front side frame 201 but the beads 202, 203 on the outer sidewall 207 are laterally spaced from the beads 202, 203 on the inner sidewall 208. Although the beads 202, 203 are disposed on a portion of each front side frame 201 which corresponds in position to a front upper part of the corresponding front wheel 206, there is no disclosure or teaching in JP 8-108865A that the aforesaid front side frame portion is recessed to allow swivel movement of the front wheel. The beads 202, 203 can reinforce the front side frames 201 to a certain extent but the reinforcing effect attained by the beads 202, 203 are found to be insufficient in the case where a recessed wheel relief portion is provided in each front side frame.

SUMMARY OF THE INVENTION

It is, therefore, an object of the present invention to provide a vehicle front body structure including a front side frame having a wheel relief portion which is sufficiently reinforced to perform efficient energy absorption without undergoing cross-sectional deformation even when a severe impact force is applied to a front end of the front side frame.

According to the present invention, there is provided a vehicle front body structure comprising a hollow front side frame of closed cross-sectional structure including an outer sidewall facing in a lateral outward direction of a vehicle and an inner sidewall facing in a lateral inward direction of the vehicle. The hollow front side frame has a wheel relief portion having a horizontal width reducing to allow swivel movement of a front wheel of the vehicle. The wheel relief portion has a pair of reinforcement beads extending in a longitudinal direction of the vehicle and projecting from the outer sidewall and the inner sidewall, respectively, into an internal space of the hollow front side frame. The reinforcement beads have top surfaces being in abutment with each other and firmly fixed together.

The wheel relief portion has a cross-sectional area much smaller than the remaining portion of the front side frame and is susceptible to cross-sectional deformation. However, by virtue of the reinforcement beads firmly joined together, the outer sidewall and the inner sidewall are integrally connected together via the reinforcement beads. With this arrangement, the wheel relief portion is able to perform highly efficient energy absorption without involving cross-sectional deformation even when subjected to a severe impact force applied to the front end of each front side frame.

Preferably, the horizontal width of the wheel relief portion reduces progressively in a downward direction. In one preferred form of the invention, the outer sidewall has a recessed portion offset toward the inner sidewall so as to form the wheel relief portion. It is preferable that the reinforcement beads are welded together by spot welding, for example. The wheel relief portion may further have a pair of second reinforcement beads extending in the longitudinal direction of the vehicle and projecting from the outer sidewall and the inner sidewall, respectively, into the internal space of the hollow front side frame. The second reinforcement beads are disposed above the first reinforcement beads and they-are laterally spaced from each other. The second reinforcement beads further increase the rigidity of the wheel relief portion.

In one preferred form of the invention, the front side frame includes a front part and a rear part butt-welded together by a weld seam. The vehicle front body structure preferably includes a bracket disposed on the front side frame astride the weld seam for attachment of a vehicle part to the vehicle front body structure. The bracket is welded to both the front part and the rear part of the front side frame. By thus attaching the bracket to the right front side frame astride the weld seam, it is readily possible to adjust or tune the mode of bending of the front side frame that may occur at the weld beam when the front side frame is subjected to a severe impact force.

The weld seam is preferably disposed adjacent to the wheel relief portion. Preferably, the bracket is mounted to support a brake hose for transmitting hydraulic pressure to a brake device incorporated in the front wheel. The bracket provided for supporting the brake hose can be also used as a reinforcement member of the weld seam. This arrangement obviates the need for a separate reinforcement member.

BRIEF DESCRIPTION OF THE DRAWINGS

One preferred structural embodiment of the present invention will be described in detail herein below, by way of example only, with the reference to the accompanying drawings, in which.

DETAILED DESCRIPTION OF THE PREFERRED EMBODIMENT

Figure 1:
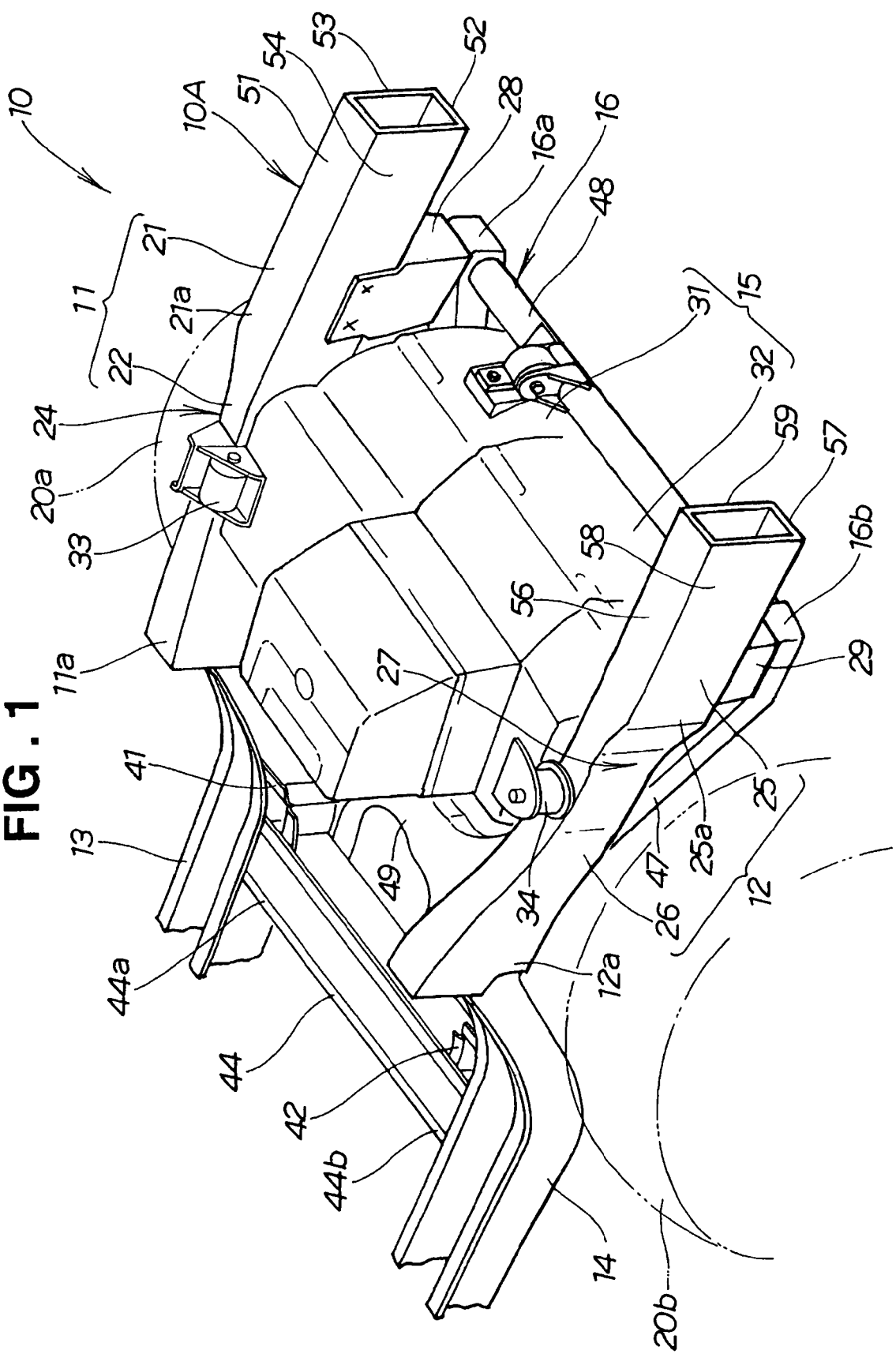
FIG. 1 is a perspective view of a vehicle front body structure according to an embodiment of the present invention.
Figure 2:
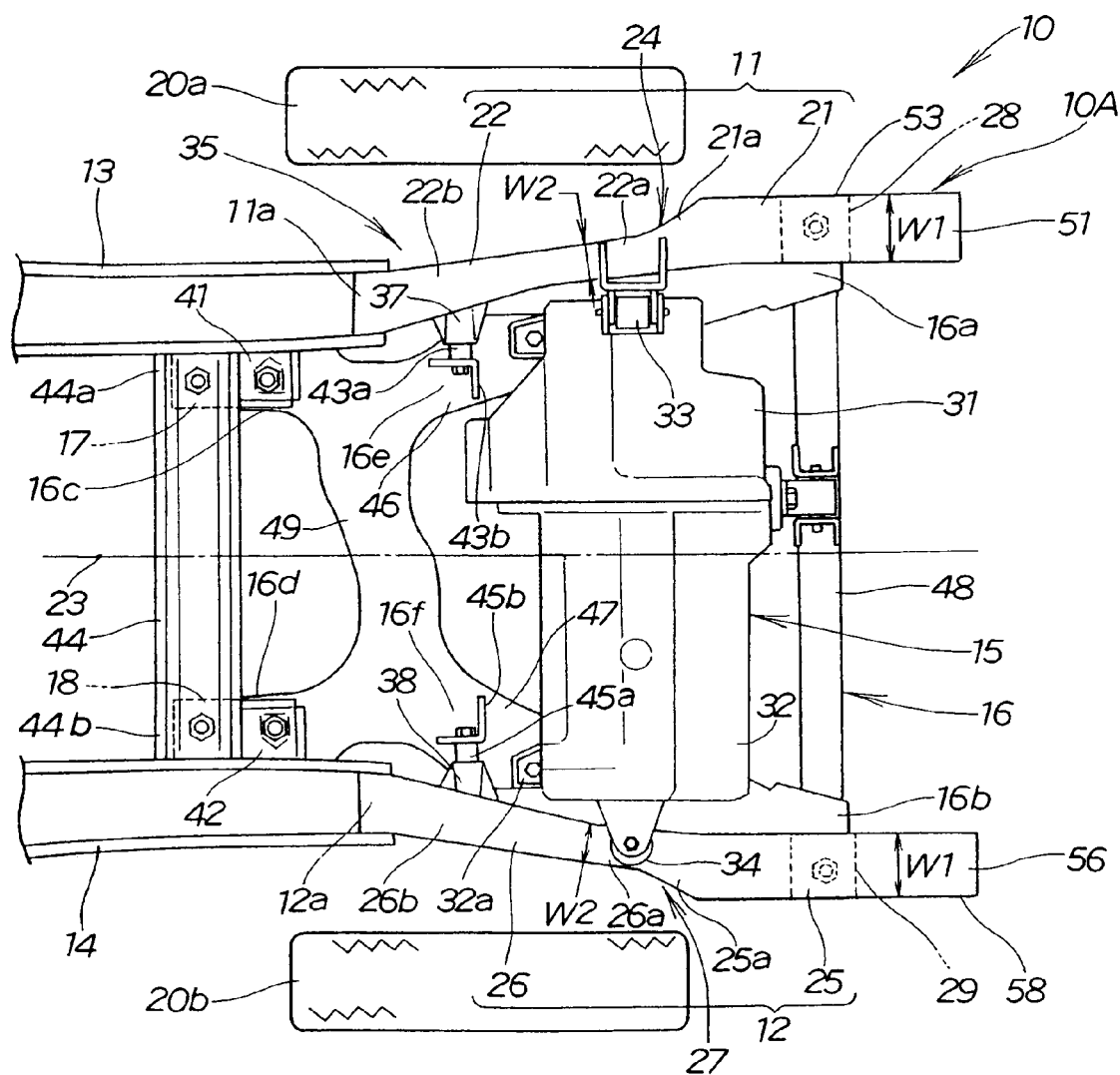
FIG. 2 is a plan view of FIG. 1.

Referring now to the drawings and FIGS. 1 and 2 in particular, there is shown a vehicle front body structure 10 according to one preferred embodiment of the present invention. The vehicle body structure 10 is comprised of a front body frame 10A including a pair of laterally spaced front side frames 11 and 12 extending in a longitudinal direction of the vehicle, a pair of laterally spaced floor frames 13 and 14 extending from respective rear ends 11a, 12a of the front side frames 11, 12 in a rearward direction of the vehicle, and a front sub-frame 16 mounted to undersides of the front side frames 11, 12. A combined engine and transmission unit 15 is disposed transversely between the front side frames 11 and 12 and mounted to the front side frames 11, 12 and the front sub-frame 16.

The left front side frame 11 (shown on the right-hand side in FIG. 1 and on the upper side in FIG. 2) extends in a horizontal plane and includes a front part 21 extending rearwards from a front end of the front body frame 10A in parallel spaced relation to a longitudinal centerline 23 (FIG. 2) of the vehicle, and a rear part 22 extending rearwards from a rear end portion 21a of the front part 21 at an angle to the longitudinal centerline 23 so that the rear part 22 progressively approaches the longitudinal centerline 23. The left front side frame 11 has a hollow structure of closed cross-sectional shape including a top wall 51, bottom wall 52, an outer sidewall 53 facing in a lateral outward direction of the vehicle, and an inner sidewall 54 facing in a lateral inward direction of the vehicle.

Similarly, the right front side frame 12 (shown on the left-hand side in FIG. 1 and on the lower side in FIG. 2) extends in a horizontal plane and includes a front part 25 extending rearwards from the front end of the front body frame 10A in parallel spaced relation to the longitudinal centerline 23 (FIG. 2) of the vehicle, and a rear part 26 extending rearwards from a rear end portion 25a of the front part 25 at an angle to the longitudinal centerline 23 so that the rear part 26 progressively approaches the longitudinal centerline 23. The right front side frame 12 has a hollow structure of closed cross-sectional shape including a top wall 56, bottom wall 57, an outer sidewall 58 facing in a lateral outward direction of the vehicle, and an inner sidewall 59 facing in a lateral inward direction of the vehicle.

The front sub-frame 16 has a left front end portion 16a (FIG. 1) bolted to a left front bracket 28 attached to an underside of the front part 21 of the left front side frame 11, and a right front end portion 16b (FIG. 1) bolted to a right front bracket 29 attached to an underside of the front part 25 of the right front side frame 12.

As shown in FIG. 2, the front part 21 of the left front side frame 11 has a width W1 except the rear end portion 21a thereof. The rear end portion 21a is offset from a main portion of the front part 21 in a lateral inward direction of the vehicle so that the rear end portion 21a has a width W2 smaller than the width W1 of the main portion of the front part 21. The rear part 22 of the left front side frame 11 has a front end portion 22a integral with the rear end portion 21a of the front part 21 and having the same width W2 as the rear end portion 21a. By thus narrowing the rear end portion 21a of the front part 21 and the front end portion 22a of the rear part 22, the left front side frame 11 has a left wheel relief portion 24, which allows a left front wheel 20a to swivel all the way from left to right without interference with the left front side frame 11. The left front wheel 20a is disposed on a lateral outer side of the outer sidewall 53 of the left front side frame 11.

Similarly, the front part 25 of the right front side frame 12 excepting the rear end portion 25a thereof has the same width W1 as the main portion of the front part 21 of the left front side frame 11. The rear end portion 25a is offset from a main portion of the front part 25 in a lateral inward direction of the vehicle so that the rear end portion 25a has the same width W2 as the rear end portion 21a, which is smaller than the width W1 of the main portion of the front part 25. The rear part 26 of the right front side frame 12 has a front end portion 26a integral with the rear end portion 25a of the front part 25 and having the same width W2 as the rear end portion 25a. By thus narrowing the rear end portion 25a of the front part 25 and the front end portion 26a of the rear part 26, the right front side frame 12 has a right wheel relief portion 27, which allows a right front wheel 20b to swivel all the way from left to right without interference with the left front side frame 12. The right front wheel 20b is disposed on a lateral outer side of the outer sidewall 58 of the right front side frame 12.

The front end portion 22a of the rear part 22 of the left front side frame 11 supports thereon a transmission mount 33 through which a transmission 31 of the combined engine and transmission unit 15 is mounted to the front body frame 10A. On the other hand, the front end portion 26a of the rear part 26 of the right front side frame 12 supports thereon an engine mount 34 through which an engine 32 of the combined engine and transmission unit 15 is mounted to the front body frame 10A.

The rear parts 22, 26 of the left and right front side frames 11, 12 extend convergently toward the left and right floor frames 13, 14 (in such a manner as to progressively approach the longitudinal centerline 23 of the vehicle) so that respective rear end portions 22b, 26b located rearwards of the combined engine and transmission unit 15 jointly form a shock absorbing section 35. The rear end portion 22b of the rear part 22, which forms one part of the shock absorbing section 35, is provided with a left central bracket 37. Similarly, the rear end portion 26b, which forms the other part of the shock absorbing section 35, is provided with a right central bracket 38. The front sub-frame 16 has a left mounting portion 16e disposed rearward of the combined engine and transmission unit 15 and detachably connected to the left central bracket 37 via a left connecting member 43a and a left mounting base member 43b, and a right mounting portion 16f disposed rearward of the combined engine and transmission unit 15 and detachably connected to the right central bracket 38 via a right connecting member 45a and a right mounting base member 45b.

As shown in FIG. 1, the left floor frame 13 extending rearwards from the rear end 11a of the left front side frame 11 has a downward inclination or slope until it reaches an intermediate portion thereof from which the left floor frame 13 extends continuously in a horizontal plane. Similarly, the right floor frame 14 extending rearwards from the rear end 12a of the right front side frame 12 has a downward inclination or slope until it reaches an intermediate portion thereof from which the right floor frame 14 extends continuously in the same horizontal plane as the left floor frame 13.

The left floor frame 13 is provided with a left rear bracket 41 projecting from an inner sidewall thereof toward the longitudinal centerline 23 (FIG. 2) of the vehicle. Similarly, the right floor frame 14 is provided with a right rear bracket 42 projecting from an inner sidewall thereof in confronting relation to the left rear bracket 41. A dash lower cross member 44 extends transversely between the left floor frame 13 and the right floor frame 14 and is integrally connected at opposite ends 44a, 44b thereof to respective rear parts of the left and right rear brackets 41, 42. The dash lower cross member 44 forms a part of the front body frame 10A.

The front sub-frame 16 further has a left rear end portion 16c (FIG. 2) bolted to the left rear bracket 41, and a right rear end portion 16d bolted to the right rear bracket 42. The left end 44a of the dash lower cross member 44 is bolted to a left bracket 17 mounted to the left rear end portion 16c of the front sub-frame 16. The right end 44b of the dash lower cross member 44 is bolted to a right bracket 18 mounted to the right rear end portion 16d of the front sub-frame 16. The front sub-frame 16 is thus mounted to the underside of the front body frame 10A.

The front sub-frame 16 comprises a framework of generally rectangular configuration including left and right longitudinal sub-frame portions 46, 47 (FIG. 1) extending along the left and right front side frames 11, 12, respectively, a front sub-frame cross member 48 interconnecting the longitudinal sub-frame portions 46, 47 at a front end of the front sub-frame 16, and a rear sub-frame cross member 49 interconnecting the longitudinal sub-frame portions 46, 47 at a portion adjacent to a rear end of the front sub-frame 16.

The left front side frame 11 and the right front side frame 12 are identical in construction and disposed in symmetrical relation to each other with respect to the longitudinal centerline 23 (FIG. 2) of the vehicle. In view of this, further description can be limited to only one of these front side frames 11, 12.

Figure 3:
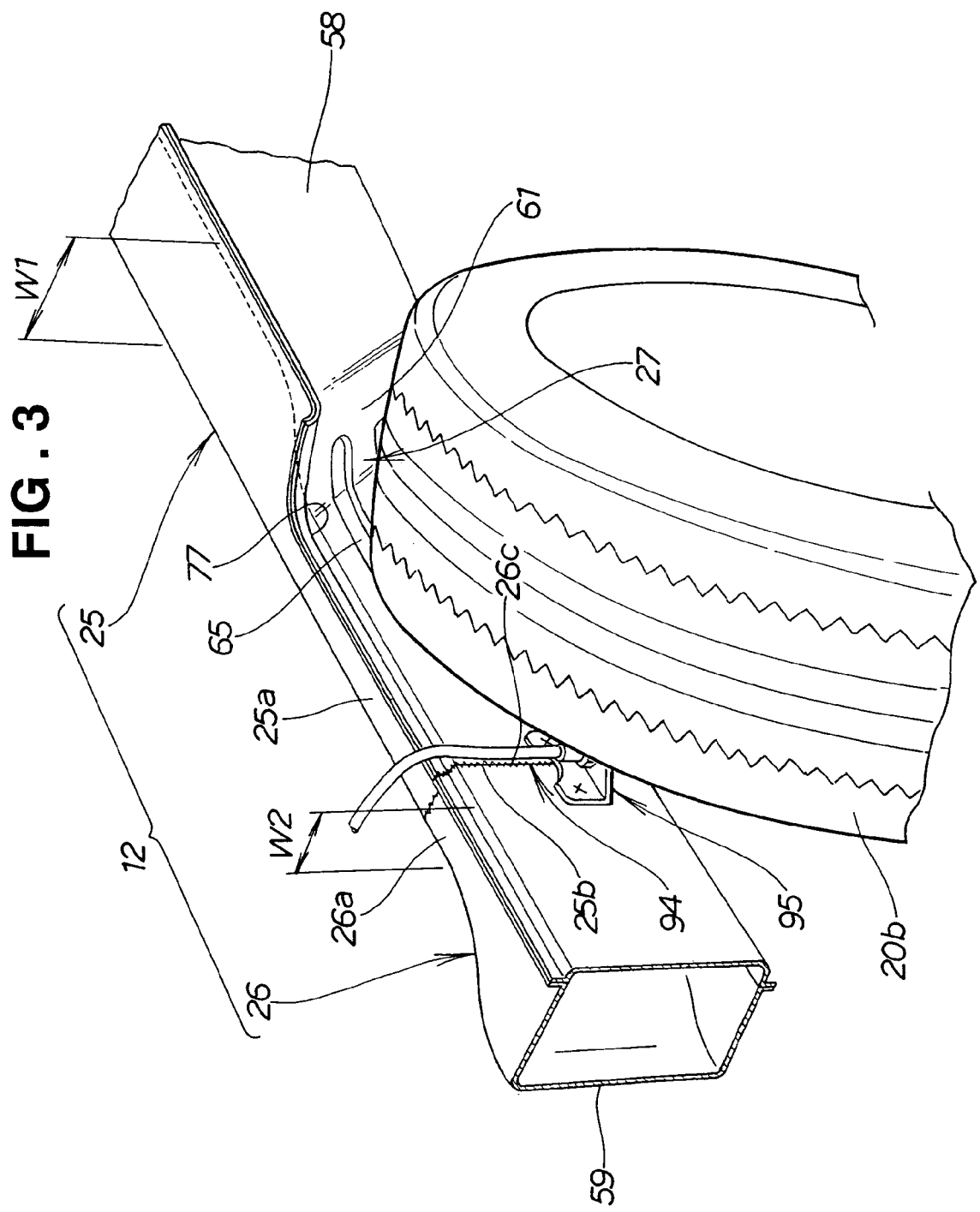
FIG. 3 is a perspective view showing on enlarged scale the relationship between a right front side frame of the vehicle front body structure and a right front wheel of the vehicle.

As shown in FIG. 3, the front part 25 of the right front side frame 12 has a rear end edge 25b butt-joined by laser welding with a front end edge 26c of the rear part 26 of the right front side frame 12. Thus, the front part 25 and the rear part 26 are integrally connected together by a weld joint or seam 94. The wheel relief portion 27 of the right front side frame 12 is formed by a recessed portion 61 of the outer sidewall 58, which is offset toward the inner sidewall 59 such that the rear end portion 25a of the front part 25 and the front end portion 26a of the rear part 26 have a reduced width W2 smaller than the width W1 of the main portion of the front part 25 of the right front side frame 12. By thus narrowing a particular part of the right front side frame 12 to provide the wheel relief portion 27, the right front wheel 20b is allowed to swivel leftward without interference which may otherwise occur between a front upper part of the right front wheel 20b and the rear end portion 25a of the front part 25 of the right front side frame 12. In FIG. 3, the front part 25 and the rear part 26 of the right front side frame 12 are illustrated as having the same thickness. This is only for convenience of illustration, and actually the rear part 26 is larger in thickness than front part 25.

Structural details of the right front side frame 12 will be described with reference to FIGS. 4 and 5. As shown in FIG. 5, the front part 25 of the right front side frame 12 is formed by a generally plate-like outer member 63 and a generally channel-like or U-shaped inner member 64 joined together by spot welding, for example, so as to define therebetween a hollow internal space. Thus, the front part 25 of the right front side frame 12 has a hollow, closed cross-sectional structure. Similarly, the rear part 26 of the right front side frame 12 is formed by a generally plate-like outer member 83 and a generally channel-like or U-shaped inner member 84 joined together by spot welding, for example, so as to define therebetween a hollow internal space. The rear part 26 of the right front side frame 12 also has a hollow, closed cross-sectional structure.

As shown in FIG. 5, the plate-like outer member 63 forms a front section 58a of the outer sidewall 58 (FIG. 4) of the right front side frame 12. The front outer sidewall section 58a is bent to form the recessed portion 61, which provides the right wheel relief portion 27. The front outer sidewall section 58a has a pair of vertically spaced reinforcement beads 65 and 66 extending in the longitudinal direction of the vehicle and projecting into the internal space of the hollow right front side frame 12.

The plate-like outer member 63 has a first flange 68 extending along a front part 63a of an upper edge of the front outer wall section 58a and projecting horizontally therefrom in a lateral outward direction of the vehicle, a second flange 71 of an L-shaped cross-section extending along a rear part 63b of the front outer wall section 58a and projecting therefrom in a lateral inward direction of the vehicle, and a third flange 73 of an inverted L-shaped cross-section extending along the length of a lower edge 63c of the front outer wall section 58a and projecting therefrom in a lateral inward direction of the vehicle. The first flange 68 is disposed forwardly of the recessed portion 61.

The U-shaped inner member 64 forms respective front sections 56a, 57a and 59a of the top wall 56, bottom wall 57 and inner sidewall 59 (FIG. 4) of the right front side frame 12. The front inner sidewall section 59a has a pair of vertically spaced reinforcement beads 75 and 76 extending in the longitudinal direction of the vehicle and projecting into the internal space of the hollow right front side frame 12. The pair of beads 65, 66 on the front outer sidewall section 58a and the pair of beads 75, 76 on the front inner sidewall section 59a are laterally aligned with each other.

The front top wall section 56a of the U-shaped inner member 64 is recessed as at a recessed longitudinal edge portion 77 so as to provide a recessed longitudinal edge portion complementary in shape with the recessed portion 61 (wheel relief portion 27) of the plate-like outer member 63. The front top wall section 56a has a front longitudinal edge portion 74 disposed forwardly of the recessed longitudinal edge portion 77, and a vertical flange 78 extending along and projecting upwardly from the recessed longitudinal edge portion 77. The front bottom wall section 57a has a longitudinal edge portion recessed as at a recessed longitudinal edge portion 79. The recessed longitudinal edge portion 79 is complementary in shape with a lower part 61a of the recessed portion 61 of the plate-like outer member 63. The lower part 61a of the recessed portion 61 is made deeper than an upper part (not designated in FIG. 5)so that a width of the front bottom wall section 57a, as measured at the recessed portion 79, is smaller than the width W2 (FIG. 4) the recessed portion 77 of the front top wall section 56a. The front bottom wall section 57a also has a vertical flange 81 extending along and projecting downwardly from the longitudinal edge thereof.

The front longitudinal edge portion 74 of the front top wall section 56a is overlapped with the first flange 68 of the plate-like outer member 63 and joined by spot welding to the first flange 68. The vertical flange 78 of the front top wall section 56a and the L-shaped second flange 71 of the plate-like outer member 63 are brought into abutment with each other and joined together by spot welding. Similarly, the vertical flange 81 of the front bottom wall section 57a and the inverted L-shaped third flange 73 of the plate-like outer member 63 are brought into abutment with each other and joined together by spot welding. By thus joining together the plate-like outer member 63 and the U-shaped inner member 64, the front part 25 of the right front side frame 12 is produced.

The plate-like outer member 83, which forms one part of the rear part 26 of the right front side frame 12, also forms a rear section 58b of the outer sidewall 58 (FIG. 4) of the right front side frame 12. The plate-like outer member 83 has a first flange 87 of an L-shaped cross-section extending along an upper edge thereof and projecting in a lateral inward direction of the vehicle body, and a second flange 89 of an inverted L-shaped cross-section extending along a lower edge thereof and projecting in the lateral inward direction of the vehicle.

The U-shaped inner member 84, which forms the other part of the rear part 26 of the right front side frame 12, also forms respective rear sections 56b, 57b and 59b of the top wall 56, bottom wall 57 and inner sidewall 59 (FIG. 4) of the right front side frame 12. The rear top wall section 56b has a vertical flange 91 extending along and projecting upwardly from a longitudinal edge thereof. The rear bottom wall section 57b also has a vertical flange 92 extending along and projecting downwardly from a longitudinal edge thereof.

The first and second flanges 87 and 89 of the plate-like outer member 83 and the upper and lower vertical flanges 91 and 92 of the U-shaped inner member 84 are respectively brought into abutment with each other and joined together by spot welding. By thus joining together the plate-like outer member 83 and the U-shaped inner member 84, the rear part 26 of the right front side frame 12 is produced.

Figure 4:
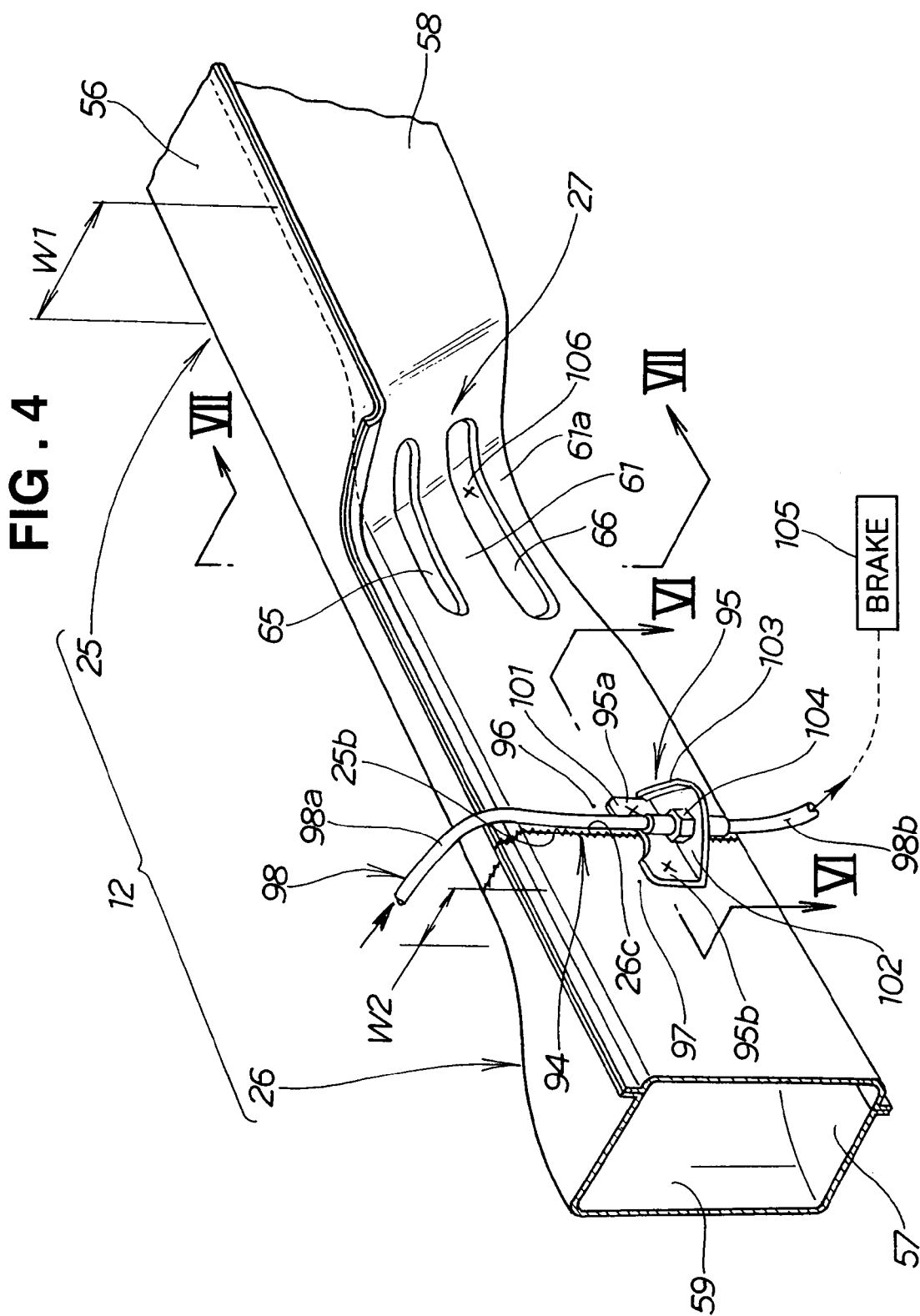
FIG. 4 is a view similar to FIG. 3, but showing the right front side frame alone.
Figure 5:
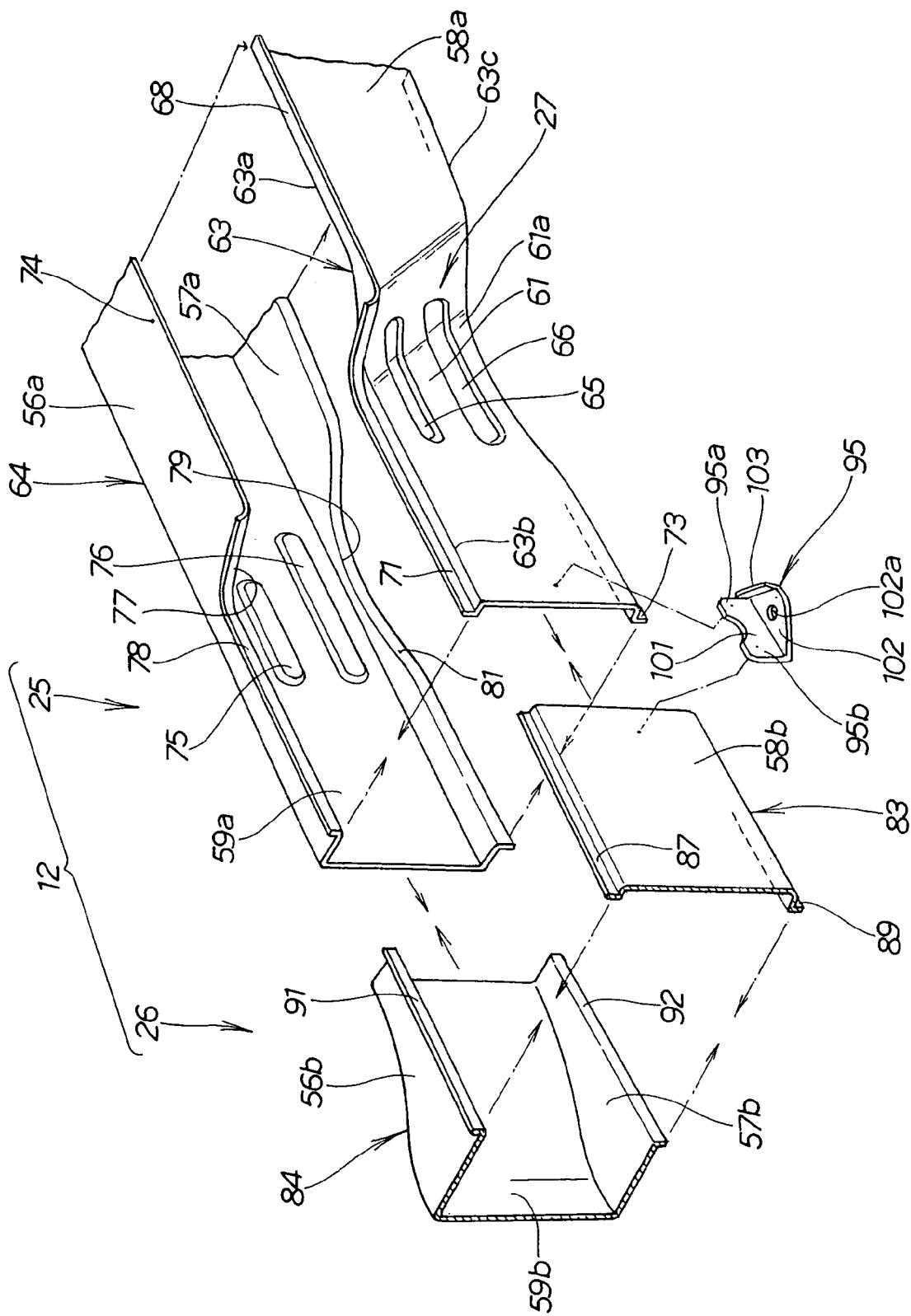
FIG. 5 is an exploded perspective view of the right front side frame.

As shown in FIG. 4, the rear end edge 25b of the front part 25 and the front end edge 26c of the rear part 26 are brought into abutment with each other and these edges 25b, 26c are butt-joined together by laser welding to form the right front side frame 12 with the front part 25 and the rear part 26 joined by the weld joint or seam 94.

A bracket 95 is disposed on the outer sidewall 58 astride the weld seam 94. The bracket 95 has a front portion 95a joined to a first area 96 of the outer sidewall 58 located forward of the weld seam 94, and a rear portion 95b jointed to a second area 97 of the outer sidewall 58 located rearward of the weld seam 94. The first outer sidewall area 96 is provided in the front part 25 of the right front side frame 12, and the second outer sidewall area 96 is provided in the rear part 26 of the right front side frame 12.

The bracket 95 is provided for supporting a brake hose 98 as a part of the vehicle. The bracket 95 includes a vertical base 101 firmly fixed to the outer sidewall 58 of the right front side frame 12, a horizontal stem 102 projecting outward from a lower edge of the base 101, and a reinforcement strip 103 extending along a front edge of the stem 102 and a front edge of the base 101. The brake hose 98 is provided to transmit hydraulic pressure from a master cylinder (not shown) to a brake device 105 incorporated in the front wheel 20b (FIG. 3) for actuation to slow down or stop the vehicle.

The base 101 has a rectangular shape and is recessed at the center of an upper side thereof so as to form a front base portion and a rear base portion that correspond respectively to the front portion 95a and the rear portion 95b of the bracket 95. The front base portion 95a is joined by spot welding to the front part 25 of the right front side frame 12 at the first area 96 located adjacent to the weld seam 94, and the rear base portion 95b is joined by spot welding to the rear part 26 of the right front side frame 12 at the second area 97 located adjacent to the weld seam 94 on the opposite side of the first area 96.

The stem 102 of the bracket 95 is triangular-shaped configuration and has a central hole 102a formed therein. A screw-on fitting 104 provided at one end of a brake hose portion 98a extending from the master cylinder (not shown) of a hydraulic brake system and a screw fitting (not shown) provided at one end of a brake hose portion 98b extending from the brake device 105 (FIG. 4) of the right front wheel 20b (FIG. 3) are fitted from opposite directions into the central hole 102a of the stem 102 and connected together with the stem 102 disposed therebetween. The brake hose 98 is thus supported to the vehicle body via the bracket 95.

As previously described, the lower part 61a of the recessed portion 61 (right wheel relief portion 27) is made deeper than the upper part of the recessed portion 61 so as to conform to the shape of the front upper part of the right front wheel 20b (FIG. 3).

Figure 6:
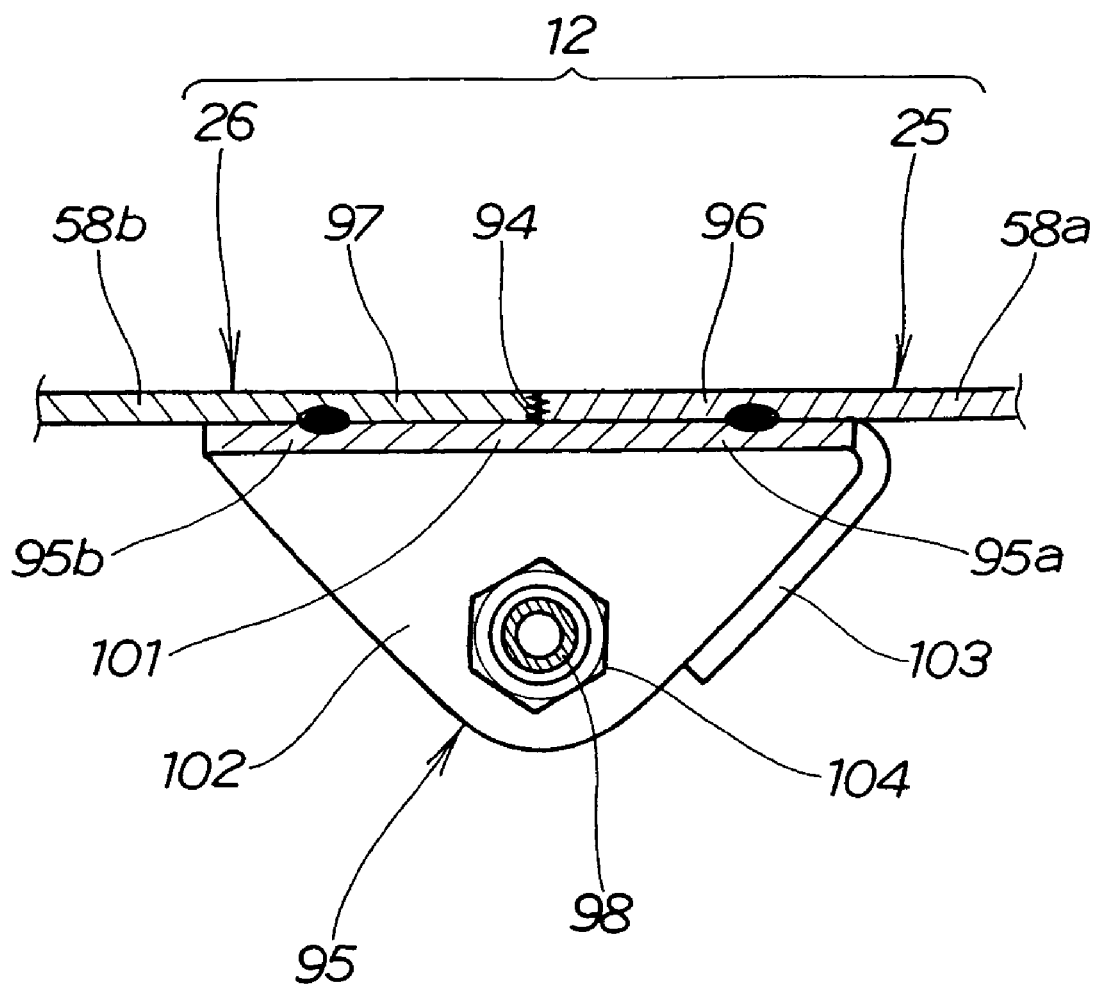
FIG. 6 is a cross-sectional view taken along line VI-VI of FIG. 4.

Reference is next made to FIG. 6. As shown in this figure, the bracket 95 for mounting the brake hose 98 to the vehicle body is disposed astride the weld seam 94 between the front part 25 and the rear part 26 of the right front side frame 12. The bracket 95 is fixed to the right front side frame 12 by spot welding the front portion 95a and the rear portion 95b of the base 101 to mating areas 96, 97 of the front part 25 and the rear part 26 that are located near the weld seam 94 at the opposite sides of the weld seam 94.

The bracket 95 thus attached to the right front side frame 12 astride the weld seam 94 serves to reinforce the weld seam 94 formed between the front part 25 and the rear part 26 of the right front side frame 12. By thus providing the bracket 95, it is readily possible to adjust or tune the mode of bending or deformation of the right front side frame 12 which may occur at the weld seam 94 when the right front side frame 12 is subjected to a severe impact force acting on a front end thereof. Furthermore, since the bracket 95 provided for supporting the brake hose 98 is also used as a reinforcement of the weld seam 94, it is possible to obviate the need for a separate reinforcement member.

Figure 7:
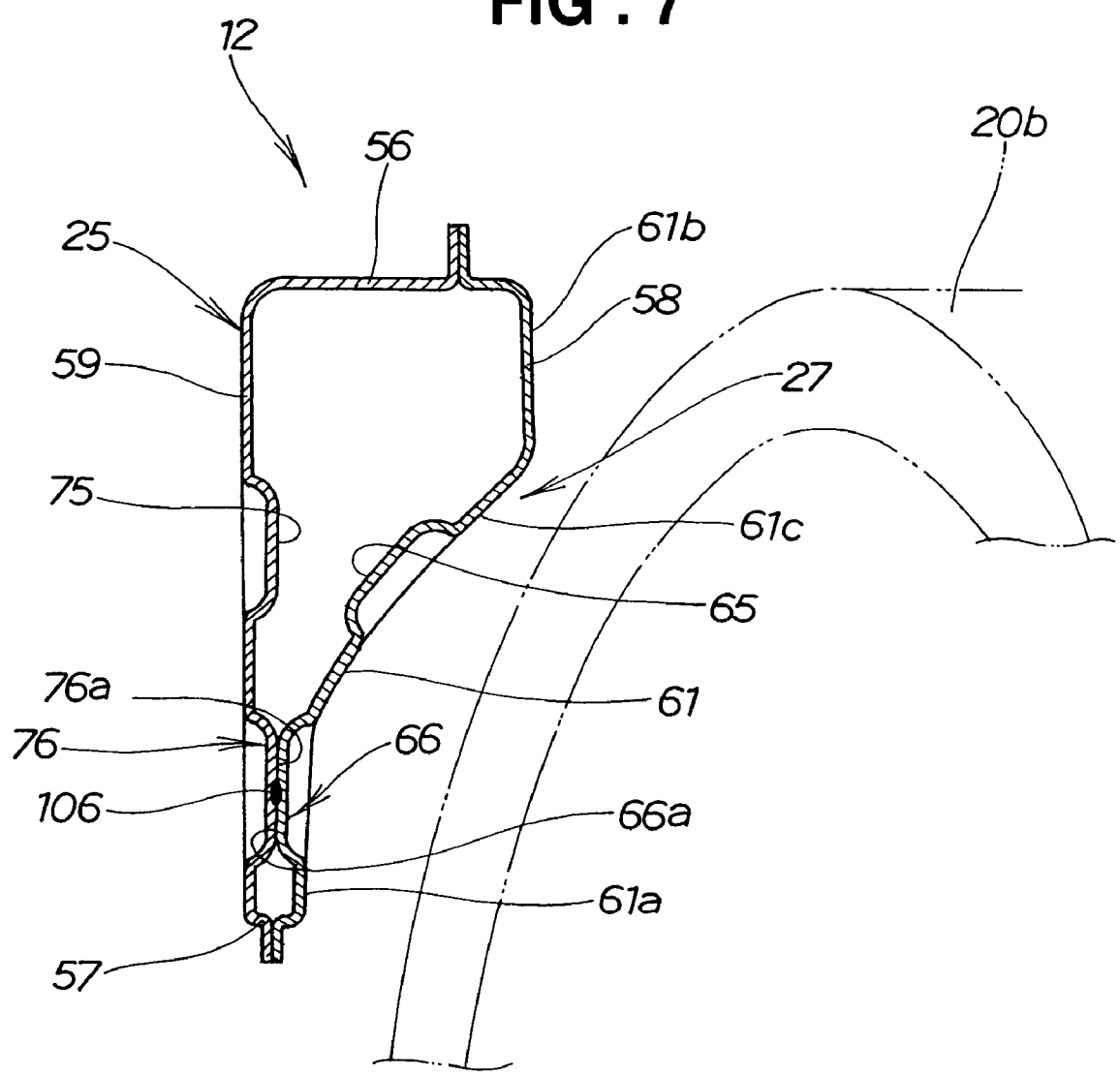
FIG. 7 is a cross-sectional view taken along line VII-VII of FIG. 4.

Reference is next made to FIG. 7. As shown in this figure, the wheel relief portion 27 formed by the recessed portion 61 of the outer sidewall 58 of the right front side frame 12 has a horizontal width reducing progressively in a downward direction. More specifically, at the wheel relief portion 27, the inner sidewall 59 of the right front side frame 12 is disposed vertically between the top wall 56 and the bottom wall 57, whereas the outer sidewall 58 has an upper part 61b extending vertically downward from the top wall 56, a central part 61c contiguous with a lower end of the upper part 61b and extending obliquely downward toward the inner sidewall 59, and the lower part 61a contiguous with a lower end of the central part 61c and extending obliquely downward toward the inner sidewall 59 at a much smaller angle of inclination to the vertical than the central part 61c, the lower part 61a terminating at the bottom wall 57 of the right front side frame 12. Thus, the recessed portion 61 of the outer sidewall 58 is made deeper at the lower part 61a thereof than at the upper part 61b. With this arrangement, the lower reinforcement bead 66, which is formed on the lower part 61a of the outer sidewall 58, comes in abutment with the lower reinforcement bead 76 of the inner sidewall 59. The lower reinforcement beads 66, 76 are joined together by spot welding as at 106 with top surfaces 66a, 76a held in abutment with each other. On the other hand, the upper reinforcement bead 65, which is formed on the central part 61c of the outer sidewall 58, is laterally spaced from the upper reinforcement bead 75 of the inner sidewall 59.

The wheel relief portion 27 of the right front side frame 12 has a smaller cross-sectional area than the other portions of the right front side frame 12 and hence is susceptible to cross-sectional deformation, failing to perform efficient absorption of energy when the right front side frame 12 is subjected to a severe impact force at a collision with another vehicle, for example. According to the invention, however, since the wheel relief portion 27 is reinforced by the upper reinforcement beads 65, 75 and the lower reinforcement beads 66, 76 provided in pairs on the outer and inner sidewalls 58, 59 of the right front side frame 12, and since the pair of lower reinforcement beads 66, 76 are joined together by spot welding 106, the wheel relief portion 27 is sufficiently reinforced to perform efficient energy absorption without causing cross-sectional deformation even when the right front side frame 12 is subjected to a severe impact force at a collision with another vehicle, for example. By thus strengthening the wheel relief portion 27 with the reinforcement beads 65, 66, 75, 76, it is possible to make a lower part 61a of the recessed portion 61 much deeper than the upper and central parts 61b and 61c of the recessed portion 61. This arrangement ensures that the recessed portion 61 forms a wheel relief portion 27 of a configuration substantially corresponding to the configuration of a front upper portion of the right front wheel 20a.

Furthermore, by virtue of the bracket 95 disposed on the right front side frame 12 astride the weld seam 94 between the front part 25 and the rear part 26 of the right front side frame 12, it is readily possible to adjust or tune the mode of deformation or bending which may occur at the weld seam 94 at a collision of the right front side frame 12 with another vehicle, for example.

Figure 8A:
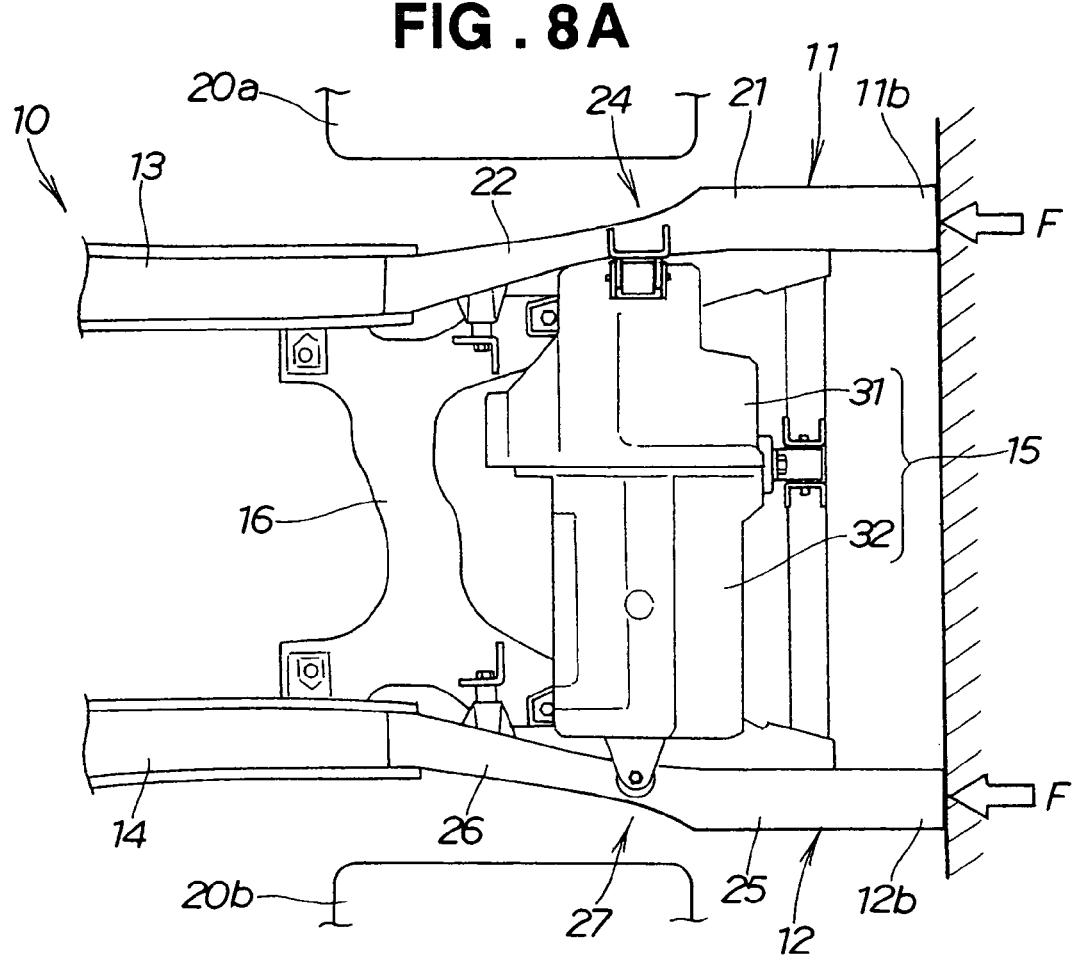
FIG. 8A is a diagrammatical plan view illustrative of the behavior of the vehicle front body structure when subjected to a heavy load such as an impact force experienced at a collision with another vehicle.
Figure 8B:
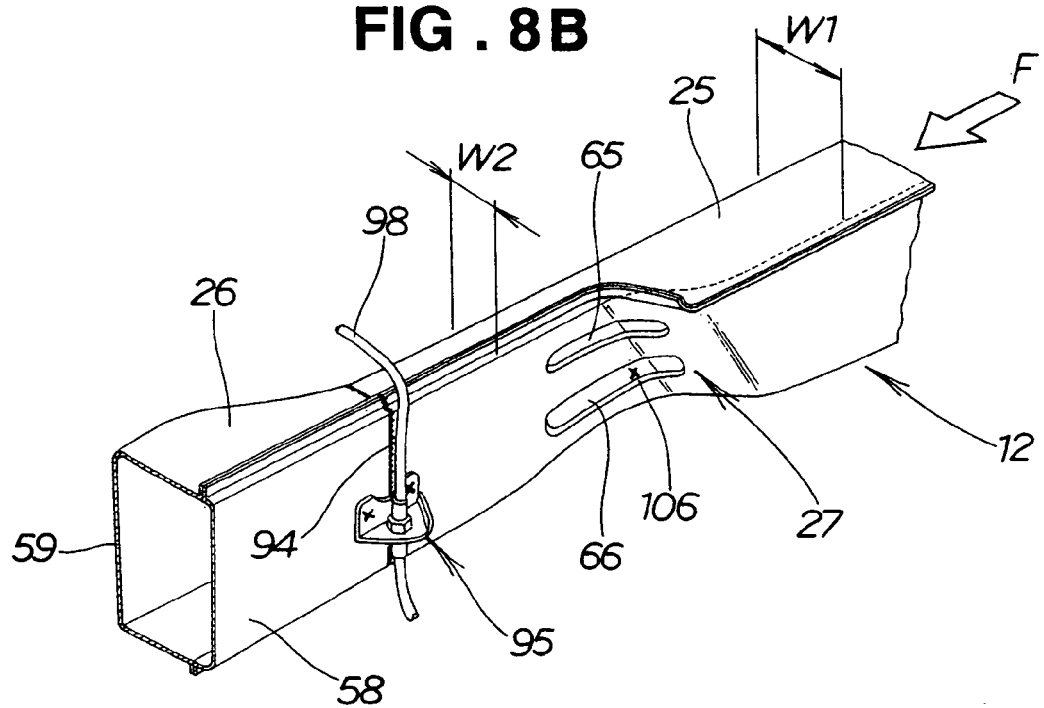
FIG. 8B is a perspective view showing the right front side frame of the vehicle front body structure shown in FIG. 8A.
Figure 9A:
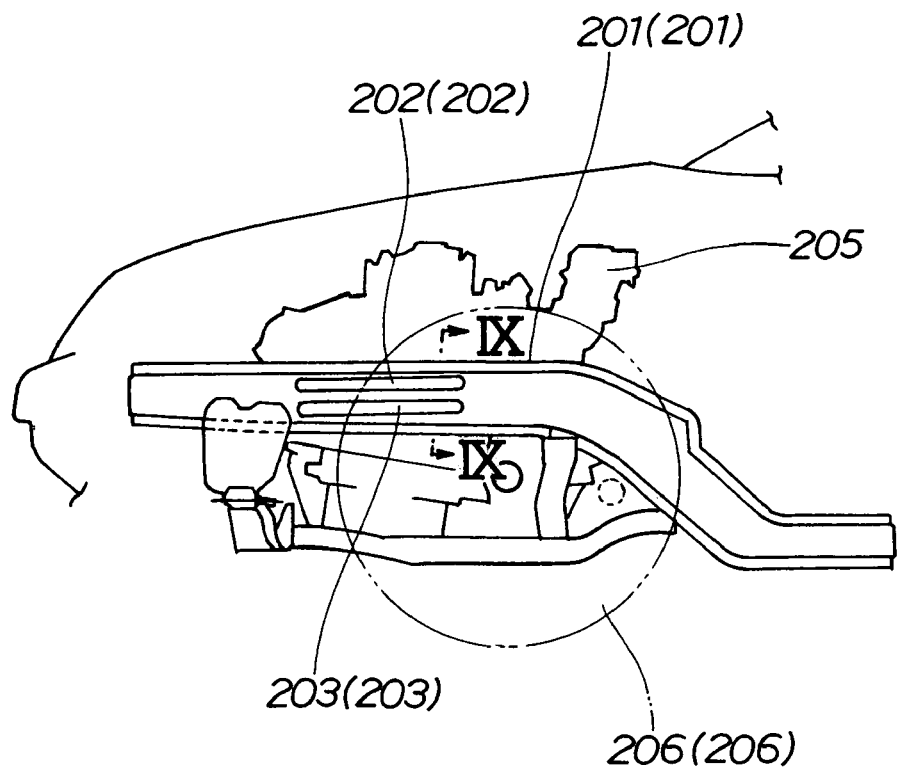
FIG. 9A is a side view showing a conventional vehicle front body structure.
Figure 9B:
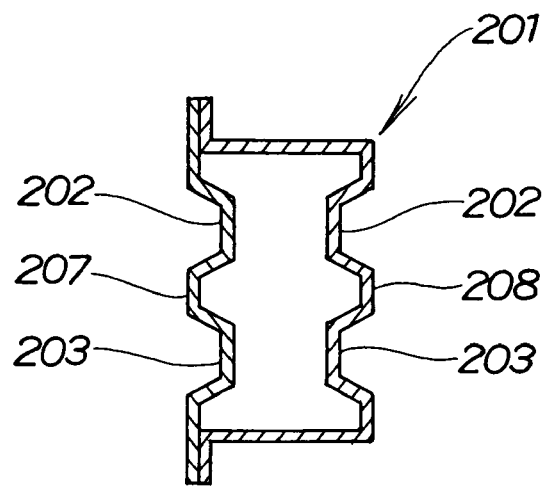
FIG. 9B is a cross-sectional view taken along line IX-IX of FIG. 9A.

FIG. 8A shows in plan view a condition when the vehicle front body structure 10 of the invention is subjected to an impact force F acting on front end portions 11b, 12b of the left and right front side frames 11, 12, and FIG. 8B shows in perspective the right front side frame 12 under the condition shown in FIG. 8A. In this instance, since the lower reinforcement bead 66 on the outer sidewall 58 of the right front side frame 12 and the lower bead 76 (FIG. 7) on the inner sidewall 59 are joined together by spot welding, the outer sidewall 58 and the inner sidewall 59 are integrally connected together via the reinforcement beads 66, 76.

With this direct joining of the outer and inner sidewalls 58, 59 effected at the wheel relief portion 27 of the right front side frame 12, it is possible to increase the rigidity of the wheel relief portion 27 to a value comparable to a rigidity of the remaining portion of the right front side frame 12 even though the cross-sectional area of the wheel relief portion 27 is much smaller than that of the remaining portion of the right front side frame 12. When subjected to the severe impact force F applied to the front end 12b (FIG. 8A), the reinforced wheel relief portion 27 is able to absorb the impact force or energy at high efficiencies without causing cross-sectional deformation. Furthermore, by virtue of the bracket 95 attached by spot welding to the right front side frame 12 astride the weld seam 94 formed between the front part 25 and the rear part 26 of the right front side frame 12, it is readily possible to adjust or tune the mode of bending that may occur at the weld beam 94 when the right front side frame 12 is subjected to a severe impact force.

In the illustrated embodiment, the lower reinforcement beads 66 and 76 on the outer and inner sidewalls 58, 59 are joined together by spot welding while the upper reinforcement beads 65 and 75 on the outer and inner sidewalls 58, 59 are laterally spaced from each other. The invention should by no means be limited to the illustrated embodiment but may include an arrangement in which the upper reinforcement beads 65, 75 are also joined together by spot welding, for example.

Obviously, various minor changes and modifications of the present invention are possible in the light of the above teaching. It is therefore to be understood that within the scope of the appended claims the invention may be practiced otherwise than as specifically described.

What is claimed is:

1. A vehicle front body structure, comprising:
a hollow front side frame of closed cross-sectional structure including an outer sidewall facing in a lateral outward direction of a vehicle and an inner sidewall facing in a lateral inward direction of the vehicle, the hollow front side frame having a wheel relief portion having a reduced horizontal width in the lateral outward direction, as compared to remaining portions of the front side frame, and wherein said horizontal width of said wheel relief portion is progressively reduced from a maximum near a top portion of the wheel relief portion to a minimum near a bottom portion of the wheel relief portion, to allow swivel movement of a front wheel of the vehicle, the wheel relief portion having a pair of first reinforcement beads extending in a longitudinal direction of the vehicle and protecting from the outer sidewall and the inner sidewall, respectively, into an internal space of the hollow front side frame, the first reinforcement beads having ton surfaces that are in abutment with each other and firmly fixed together, and wherein the wheel relief portion further has a pair of second reinforcement beads extending in the longitudinal direction of the vehicle and projecting from the outer sidewall and the inner sidewall, respectively, into the internal space of the hollow front side frame, the second reinforcement beads being disposed above the first reinforcement beads and laterally spaced from each other.

2. A front body structure for a vehicle, comprising:
a hollow front side frame of closed cross-sectional structure including:
an inner sidewall facing in a lateral inward direction of the vehicle, said inner sidewall extending generally vertically downward;
an outer sidewall facing in a lateral outward direction of the vehicle, the outer sidewall including:
an upper part extending vertically downward;
a central part contiguous with the upper part and extending obliquely downward from the upper part toward the inner sidewall and then vertically extending downward; and
a lower part contiguous with a lower end of the central part and extending obliquely downward toward the inner sidewall at a much smaller angle of inclination to the vertical than the central part, wherein the lower part terminates at a bottom wall, and wherein a recessed portion of the outer sidewall is made deeper at the lower part thereof than at the upper part.

3. The front body structure according to claim 2, wherein the outer sidewall has a wheel relief portion with a horizontal width reducing to allow swivel movement of a front wheel of the vehicle.

4. The front body structure according to claim 3, wherein a pair of first reinforcement beads extend in a longitudinal direction of the vehicle and project from the outer sidewall and the inner sidewall, respectively, into an internal space of the hollow front side frame.

5. The front body structure according to claim 4, wherein the first reinforcement beads have top surfaces in abutment with each other and firmly fixed together.

6. The front body structure according to claim 2, wherein the wheel relief portion further has a pair of second reinforcement beads extending in the longitudinal direction of the vehicle and projecting from the outer sidewall and the inner sidewall, respectively, into the internal space of the hollow front side frame, the second reinforcement beads being disposed above the first reinforcement beads and laterally spaced from each other.

7. The front body structure according to claim 2, the front side frame further comprising:
   a front part and a rear part butt-welded together by a weld seam; and
   a bracket disposed on the front side frame astride the weld seam for attachment of a vehicle part to the front body structure, the bracket being welded to both the front part and the rear part of the front side frame.

8. The front body structure according to claim 7, wherein the weld seam is disposed adjacent to the wheel relief portion.

9. The front body structure according to claim 7, wherein the bracket is mounted to support a brake hose for transmitting hydraulic pressure to a brake device incorporated in the front wheel.

* * * * *